US010022928B2

(12) United States Patent
Satrape et al.

(10) Patent No.: US 10,022,928 B2
(45) Date of Patent: Jul. 17, 2018

(54) MEASURING TIRE PRESSURE IN A TIRE MOLD

(71) Applicant: The Goodyear Tire & Rubber Company, Akron, OH (US)

(72) Inventors: James Vincent Satrape, Akron, OH (US); Ching-Chih Lee, Hudson, OH (US); David Lee Bair, Hudson, OH (US); Le Zhang, Yorktown, VA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/487,903

(22) Filed: Apr. 14, 2017

(65) Prior Publication Data
US 2017/0217114 A1    Aug. 3, 2017

Related U.S. Application Data

(62) Division of application No. 12/956,676, filed on Nov. 30, 2010, now Pat. No. 9,656,434.

(51) Int. Cl.
| | | |
|---|---|---|
| *B29D 30/06* | (2006.01) | |
| *B29K 105/24* | (2006.01) | |
| *B29K 105/00* | (2006.01) | |

(52) U.S. Cl.
CPC .... *B29D 30/0662* (2013.01); *B29K 2105/246* (2013.01); *B29K 2105/253* (2013.01)

(58) Field of Classification Search
CPC .......... B29D 30/0662; B29K 2105/246; B29K 2105/253
See application file for complete search history.

(56) References Cited

U.S. PATENT DOCUMENTS

| | | |
|---|---|---|
| 3,096,541 A | 7/1963 | Sindelar |
| 4,115,046 A | 9/1978 | Smith et al. |
| 4,143,114 A | 3/1979 | Smith et al. |

(Continued)

FOREIGN PATENT DOCUMENTS

| | | |
|---|---|---|
| EP | 1000727 A1 | 5/2000 |
| EP | 1785706 A1 | 5/2007 |

(Continued)

OTHER PUBLICATIONS

European Search Report for Application EP11188173 (dated Mar. 28, 2012) retrieved from Global Dossier on Oct. 10, 2017.*

(Continued)

*Primary Examiner* — Robert J Grun
(74) *Attorney, Agent, or Firm* — Alvin T. Rockhill

(57) ABSTRACT

Pressure sensors may be used to directly measure the pressure between a green tire and a curing apparatus during shaping and/or during curing. This can be accomplished by a method including the steps of: (A) providing a bladder, a tire mold and, a green tire having a pair of annular beads and one or more plies; (B) mounting a first pressure sensor to an inner surface of the green tire between an overlay and a belt; (C) inserting the green tire into the tire mold and closing the tire mold; (D) shaping the green tire by expanding the bladder within the green tire against the closed tire mold; and, (E) directly measuring the pressure between the overlay and the belt of the green tire during step (D) with the first pressure sensor.

20 Claims, 11 Drawing Sheets

(56) References Cited

U.S. PATENT DOCUMENTS

| | | |
|---|---|---|
| 4,422,987 A | 12/1983 | Arimatsu |
| 4,502,857 A | 3/1985 | Hinks |
| 4,597,929 A | 7/1986 | Blayne |
| 4,625,101 A | 7/1986 | Hinks et al. |
| 4,763,534 A | 8/1988 | Hager |
| 4,781,561 A | 11/1988 | Casa et al. |
| 5,256,348 A | 10/1993 | Waller |
| 5,500,065 A | 3/1996 | Koch et al. |
| 6,637,276 B2 | 10/2003 | Adderton et al. |
| 6,666,079 B2 | 12/2003 | Poulbot et al. |
| 7,104,298 B2 | 9/2006 | Starinshak |
| 7,325,448 B2 | 2/2008 | Ichikawa et al. |
| 2005/0269654 A1 | 12/2005 | Tanaka et al. |
| 2009/0151829 A1 | 6/2009 | Lionetti et al. |
| 2009/0324763 A1 | 12/2009 | Buvat et al. |
| 2010/0220065 A1 | 9/2010 | Ma |

FOREIGN PATENT DOCUMENTS

| | | | |
|---|---|---|---|
| JP | 2007298428 A | 11/2007 | |
| JP | 2007301899 A | 11/2007 | |

OTHER PUBLICATIONS

European Search Report for corresponding EP Application No. 11188173.6-2307 dated Mar. 28, 2012 provided by the EPO.

\* cited by examiner

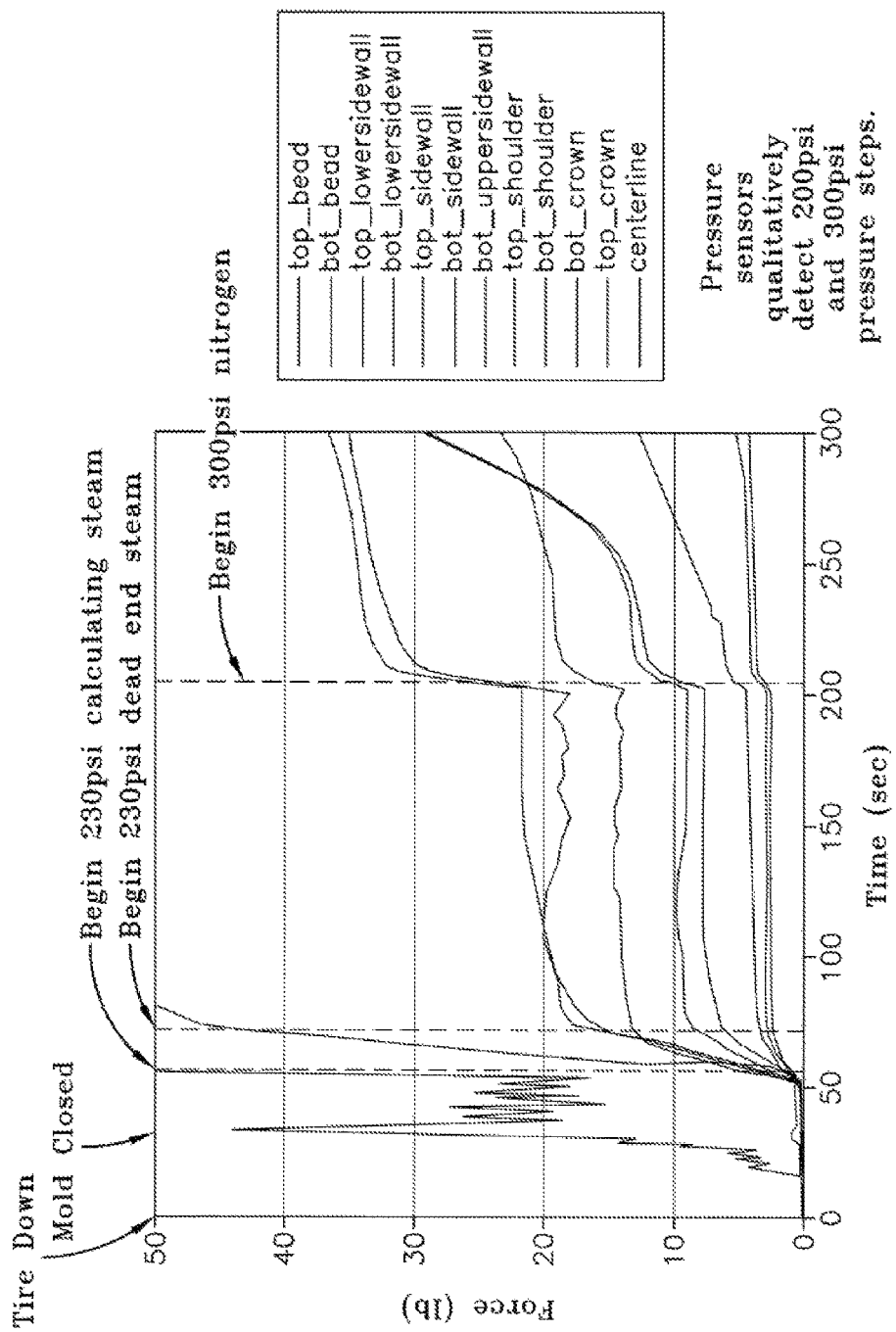

MEASURING TIRE PRESSURE IN A TIRE MOLD

This is a divisional of U.S. patent application Ser. No. 12/956,676, filed on Nov. 30, 2010. The teachings of U.S. patent application Ser. No. 12/956,676 are incorporated herein by reference in their entirety.

FIELD OF THE INVENTION

This invention generally relates to methods and apparatuses concerning the shaping of tires in tire molds and more specifically to methods and apparatuses concerning the direct measurement of pressure on a tire going through a shaping process and/or a curing process.

BACKGROUND OF THE INVENTION

It is long known to manufacture a tire using the following method: (1) construct a green (uncured) tire on a tire building drum; (2) insert the green tire into a tire mold; (3) close the tire mold around the green tire; (4) shape the green tire against the tire mold with a bladder; (5) vulcanize the green tire into a cured tire with a curing press; and, (6) open the mold and remove the cured tire.

Understanding and controlling the tire shaping process is important to ensure proper tire component positions and gauges, and consequently tire uniformity and performance. One important aspect of the shaping process is the specific pressure exerted on the tire by the bladder and by the mold. Given the relatively high pressures and temperatures that are used in shaping a tire, it has proven to be very difficult to determine with accuracy the pressures involved. Similarly, it has proven to be very difficult to determine with accuracy the pressures involved in curing a tire. It is only known to use indirect methods to determine these pressures—such as using thermocouples where a sudden temperature jump indicates the onset of contact.

What is needed is a way to directly determine the pressures exerted on a tire during the shaping process and/or during the curing process.

SUMMARY OF THE INVENTION

According to one embodiment of this invention, an apparatus may comprise: a tire mold that is closable about an associated green tire; and, a first pressure sensor that is one of: (1) positioned between the associated green tire and an associated bladder; and, used to directly measure the pressure between the associated green tire and the associated bladder while the associated bladder is expanded to shape the associated green tire against the closed tire mold; and, (2) positioned between the associated green tire and the tire mold; and, used to directly measure the pressure between the associated green tire and the tire mold while an associated tire curing press vulcanizes the associated green tire within the tire mold into an associated cured tire.

According to another embodiment of this invention, a method may comprise the steps of: (A) providing a bladder, a tire mold and, a green tire; (B) mounting a first pressure sensor to one of an inner surface of the green tire and an outer surface of the bladder; (C) inserting the green tire into the tire mold and closing the tire mold; (D) shaping the green tire by expanding the bladder within the green tire against the closed tire mold; and, (E) using the first pressure sensor to directly measure the pressure between the green tire and the bladder during step (D).

According to yet another embodiment of this invention, a method may comprise the steps of: (A) providing a tire curing press, a tire mold and, a green tire; (B) mounting a first pressure sensor to one of an outer surface of the green tire and an inner surface of the tire mold; (C) inserting the green tire into the tire mold and closing the tire mold; (D) vulcanizing the green tire within the tire mold into a cured tire; and, (E) using the first pressure sensor to directly measure the pressure between the green tire and the tire mold during step (D).

One advantage of present invention is the contact sequence measurement method can be used to diagnose and correct press shaping problems, detect non-symmetric shaping, both top vs. bottom and circumferential variations, validate FEA press-shaping modeling work, and diagnose other curing press issues such as lights (that is, areas of incomplete mold filing).

One advantage of present invention is the method can also be used to measure absolute pressures inside the tire, which may be useful in developing an understanding of tire blow point. The measurement can be done during the entire shaping and/or curing process rather than only before the mold is closed.

One advantage of present invention is the method measures the contact pressure between the bladder/green tire and green tire/mold directly, rather than using an indirect method such as temperature which can only indicate contact.

Other benefits and advantages of the invention will become apparent to those skilled in the art to which it pertains upon a reading and understanding of the following detailed specification.

Definitions

The following definitions are applicable to the present invention.

"Axial" and "axially" mean lines or directions that are parallel to the axis of rotation of the tire.

"Carcass" means the tire structure apart from the belt structure, tread, and undertread but including the beads.

"Radial" and "radially" are used to mean directions radially toward or away from the axis of rotation of the tire.

"Tread" means an extruded rubber component which, when bonded to a tire casing, includes that portion of the tire that comes into contact with the road when the tire is normally inflated and under normal load. The tread has a depth conventionally measured from the tread surface to the bottom of the deepest groove of the tire.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 8 shows a plot of force versus time results when using pressure sensors.

DETAILED DESCRIPTION OF THE INVENTION

Figure 1:
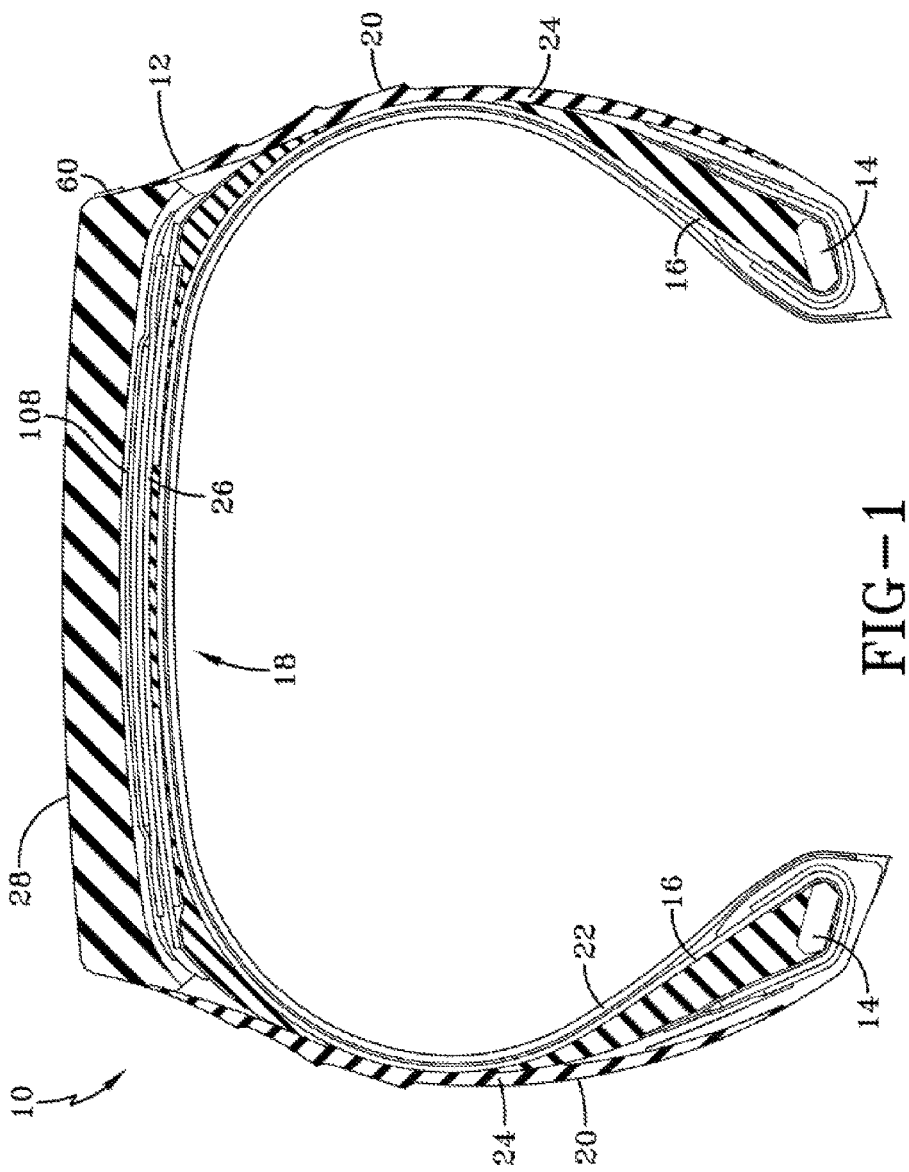
FIG. 1 is a cross sectional view of a tire.
Figure 4A:
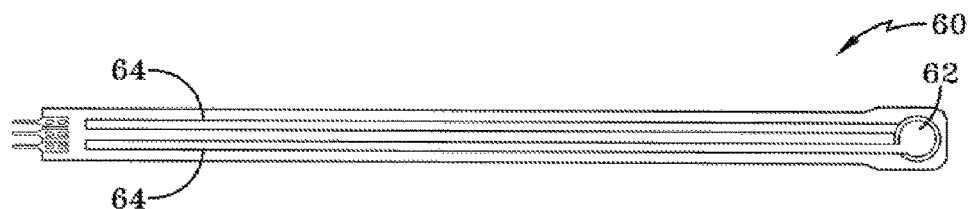
FIG. 4A is a perspective view of a High-Temperature pressure sensor.

Referring now to the drawings wherein the showings are for purposes of illustrating embodiments of the invention only and not for purposes of limiting the same, and wherein like reference numerals are understood to refer to like components, FIG. 1, shows a tire 10 that may use at least one pressure sensor 60, shown in FIG. 4A, according to this invention. The tire 10 may be of any type and size chosen with the sound judgment of a person of skill in the art including, for some non-limiting examples, a truck tire, a light truck tire, an airplane tire or a passenger tire. The tire 10 may have a carcass 12 that may include a pair of annular beads 14, 14, one or more plies 16 that may extend from around the beads 14, 14, and sidewall rubber portions 24, 24, as shown. The carcass 12 may define a crown section 18 and a pair of sidewalls 20, 20. Other conventional components may be positioned on the carcass 12 such as an inner liner 22, a belt package 26 and a tread 28. Because a tire carcass and these other components are well known to those of skill in the art, further details will not be provided except as noted below.

Figure 2:
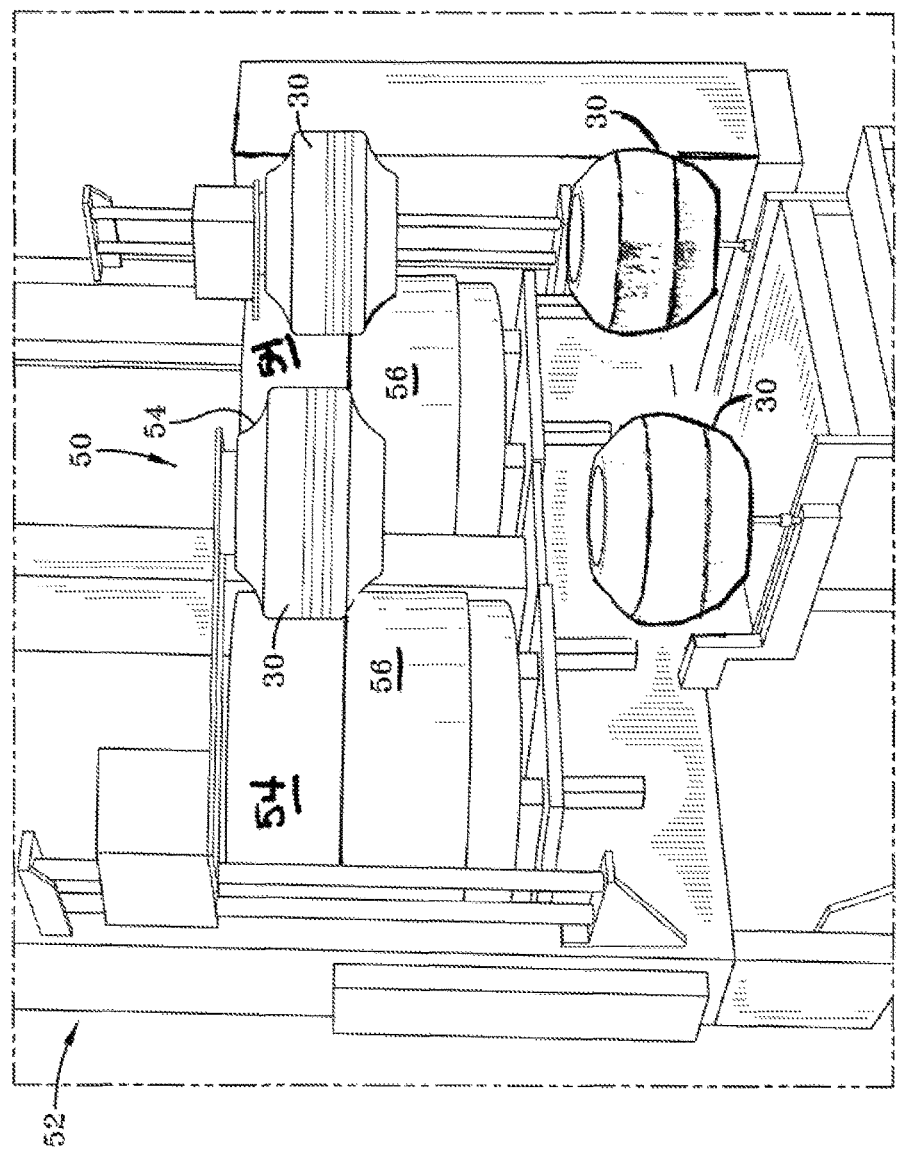
FIG. 2 is a perspective view of a tire curing apparatus.
Figure 3:
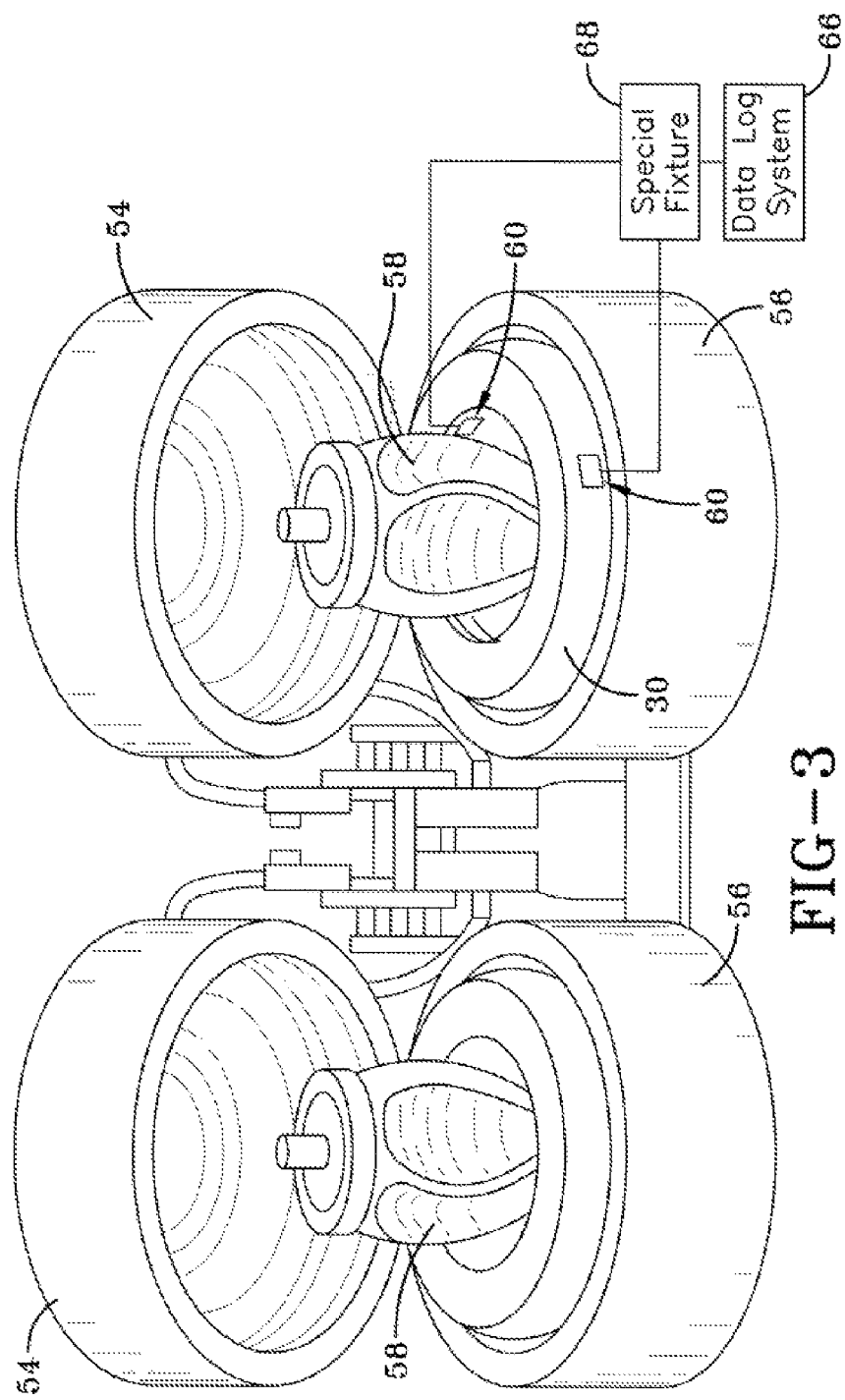
FIG. 3 is a perspective schematic view of a tire curing apparatus with bladders visible.

With reference now to FIG. 2, the tire 10 may be first formed as a green (uncured) tire 30 (four such green tires are shown) as is well known in the art. The green tire 30 may then be taken to a tire apparatus 50 where it may be shaped and vulcanized (cured). The tire apparatus 50 can be of any type and size chosen with the sound judgment of a person of skill in the art. For the embodiment shown in FIG. 2, tire apparatus 50 may include a tire curing press 52 that exerts pressure to hold upper and lower mold halves 54, 56 together during the shaping and vulcanization processes. FIG. 3 is a schematic representation showing the upper mold halves 54 lifted up to reveal the bladders 58 used to shape the tires 30. Because the operation of tire curing presses and tire molds is well known to those of skill in the art, further details will not be provided except as noted below.

FIG. 4A shows a pressure sensor 60 that may be used in this invention. The pressure sensor was used to directly measure the pressure data during a tire shaping and curing process. Here by "directly" it is meant that the data obtained is from real experimental measurement, not an inference from other data, such as data inferred indirectly from temperature measurement. Using the pressure sensors 60 of this invention, a tire engineer may accurately measure the contact pressures during the whole shaping process and/or the whole curing process both: (1) between the bladder 58 and green tire 30; and/or, (2) between the green tire 30 and mold halves 54, 56. Other possible applications include, for example without limitation, to diagnose and correct shaping problems; to detect non-symmetric shaping variation between the top and bottom mold halves and along the circumference of the mold; to validate the simulation results from running finite element analysis (FEA) on of press-shaping modeling; and to diagnose other curing press issues.

Figure 4B:
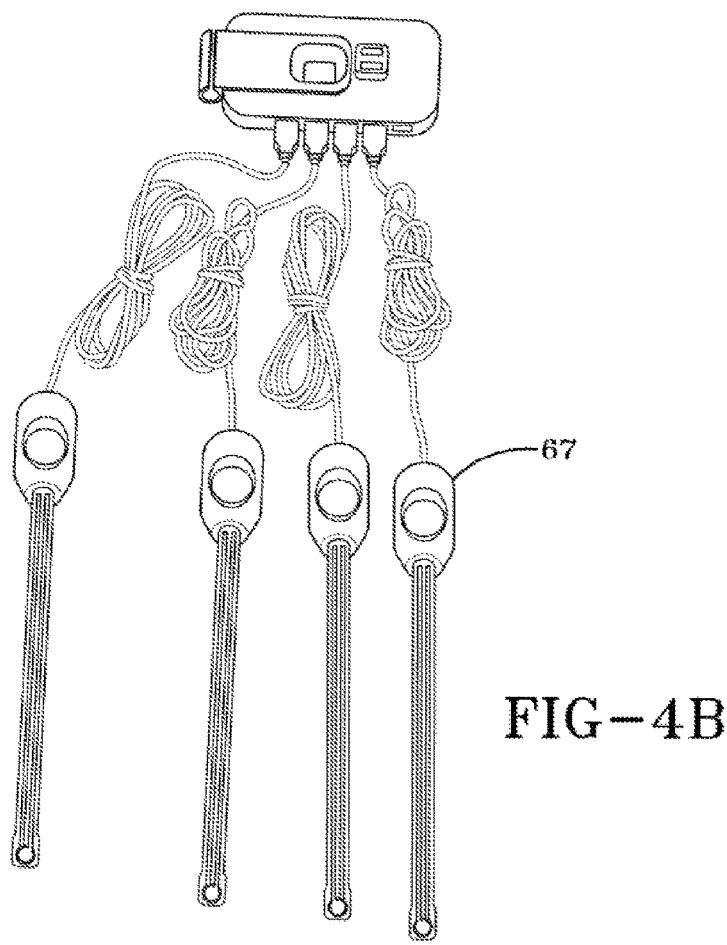
FIG. 4B is a perspective view of a multi-handle system with handles connected to a USB hub.
Figure 4C:
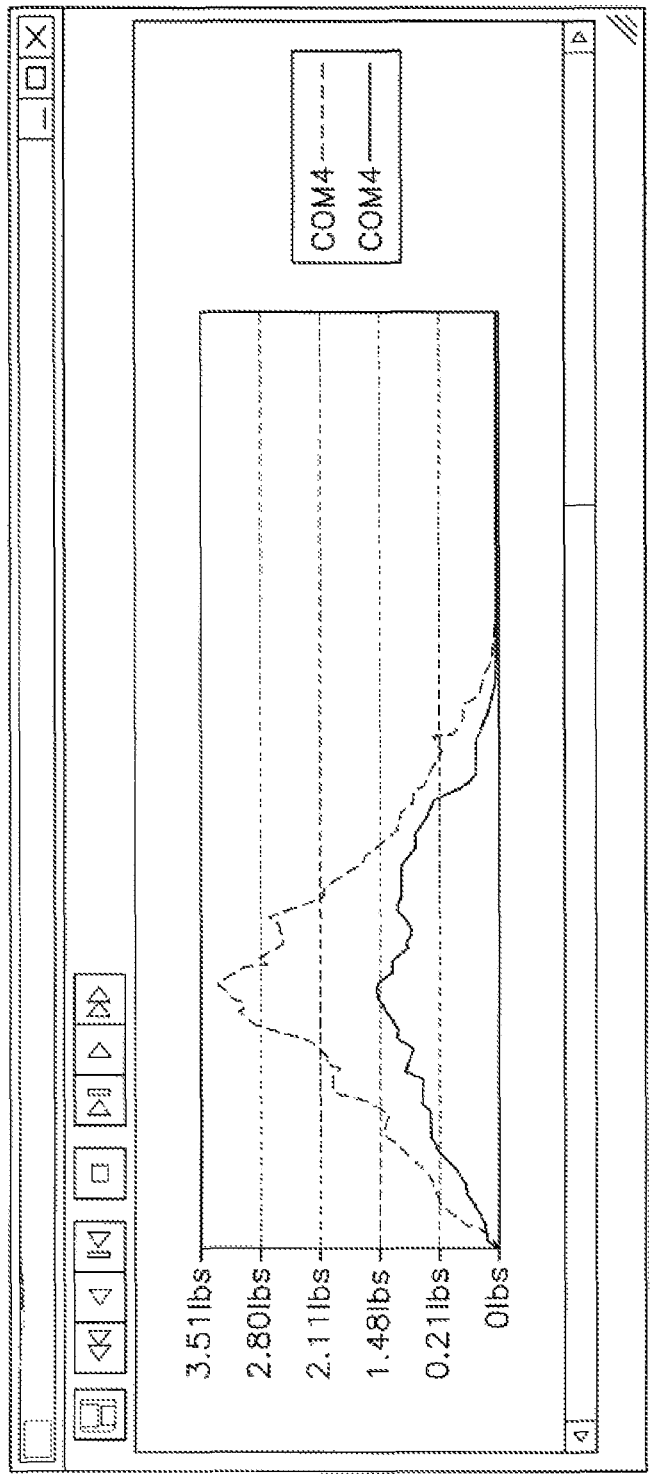
FIG. 4C is a software interface showing the force variation measured with the pressure sensor.
Figure 5:
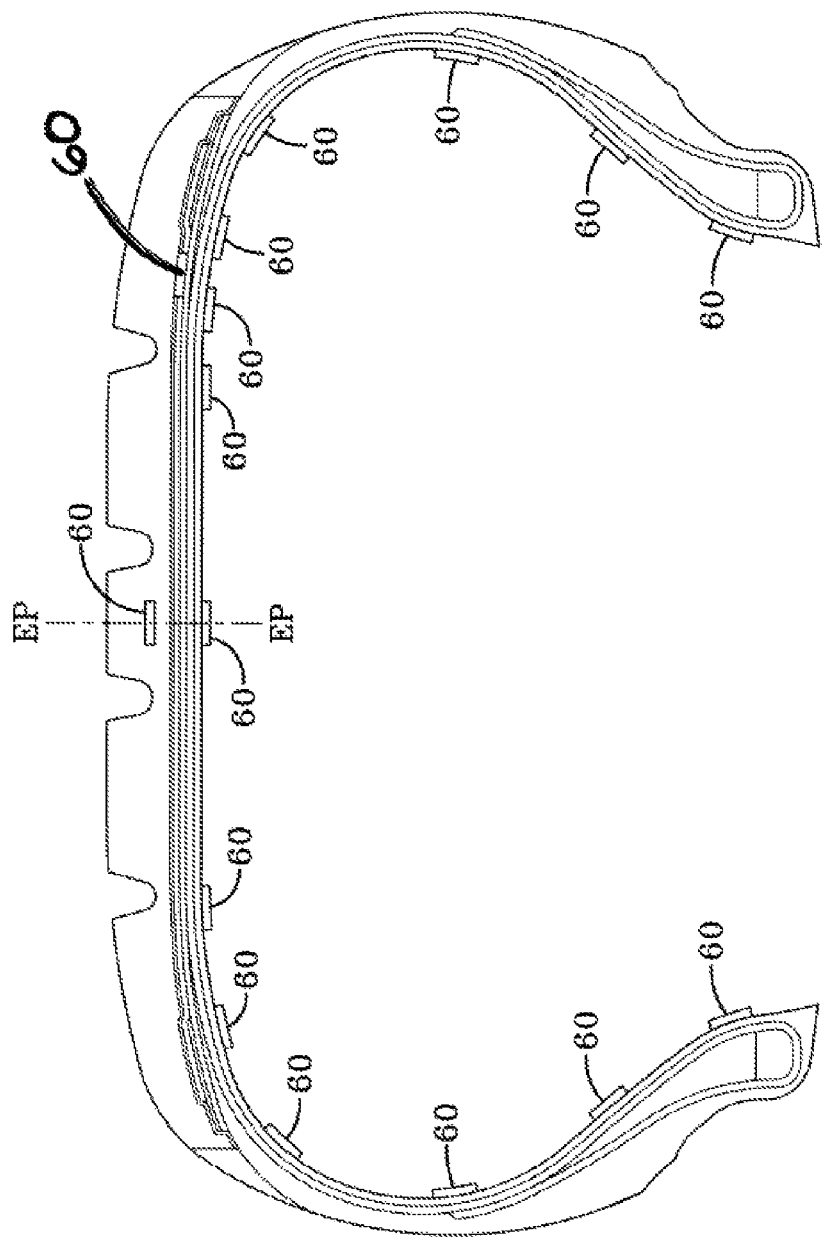
FIG. 5 shows the locations of the pressure sensors and thermocouples with respect to a tire in one embodiment.
Figure 6:
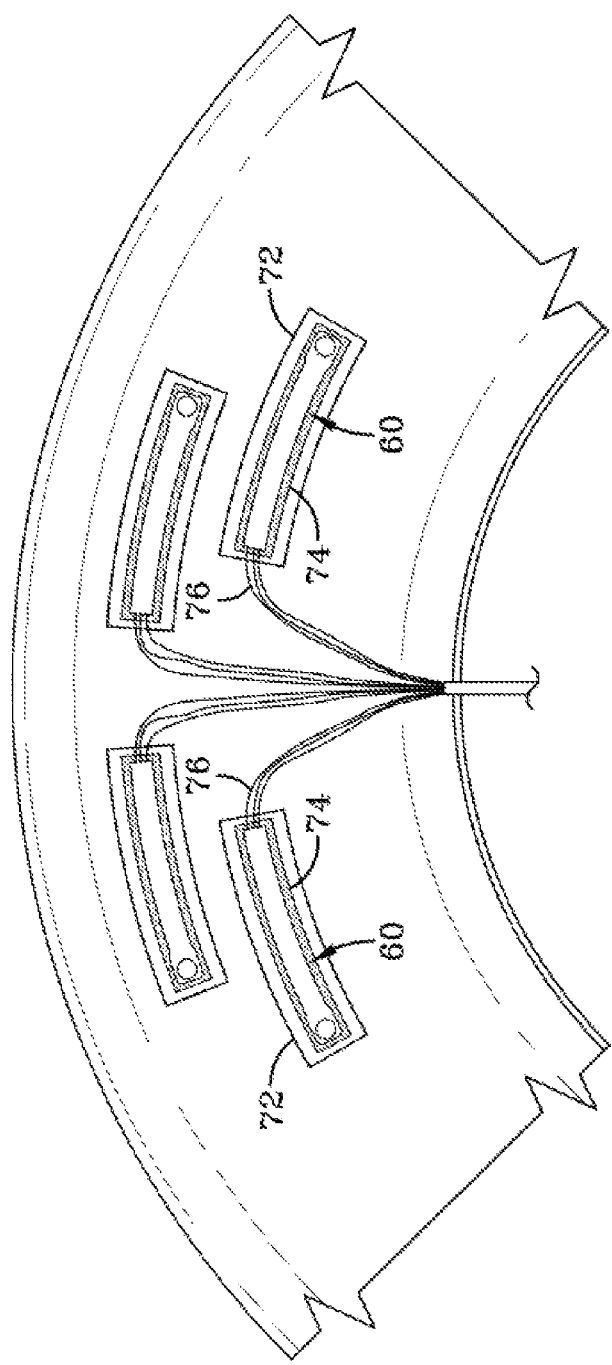
FIG. 6 shows a perspective view of pressure sensors mounted to a tire sidewall.

With reference now to FIGS. 3-5, the pressure sensor 60 may include a layer of electrical resistive ink 62 sandwiched between thin circular conducting plates 64. The electrical resistance between the plates 64 may decrease proportionally to the increase of the squeezing force, and thus proportionally to the pressure. A pressure sensor 60 may be of any size and shape chosen with the sound judgment of a person of skill in the art. In one embodiment, the pressure sensor 60 may be about 2 inches long. A data logging system 66 (Economical Load and Force (ELF) system with 16 channels for recording data of up to 16 pressure sensors) may be used to record the pressure data. There is also a handle system with handles 67 connected to universal serial bus (USB) hub. A special fixture 68 designed for high temperature may connect the sensor 60 and handle 67. If the handles 67 can withstand the actual temperatures encountered, such fixture 68 will not be necessary. The pressure sensor 60 can be calibrated in standard press with known pressure characteristics for pressures up to 400 psi and temperatures up to 200 Celsius. In testing, in order to verify the pressure sensor 60 results, thermocouples were used.

Figure 7A:
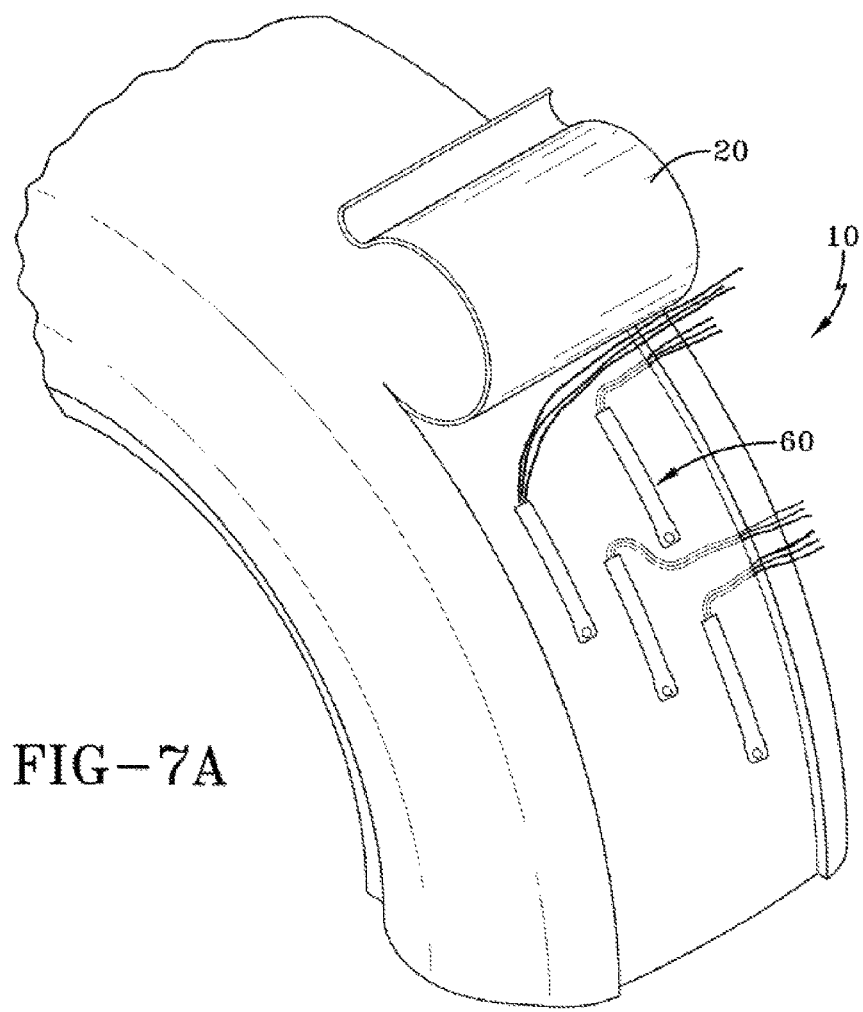
FIG. 7A shows a perspective view of the pressure sensors mounted to a tire between the tread and belt.
Figure 7B:
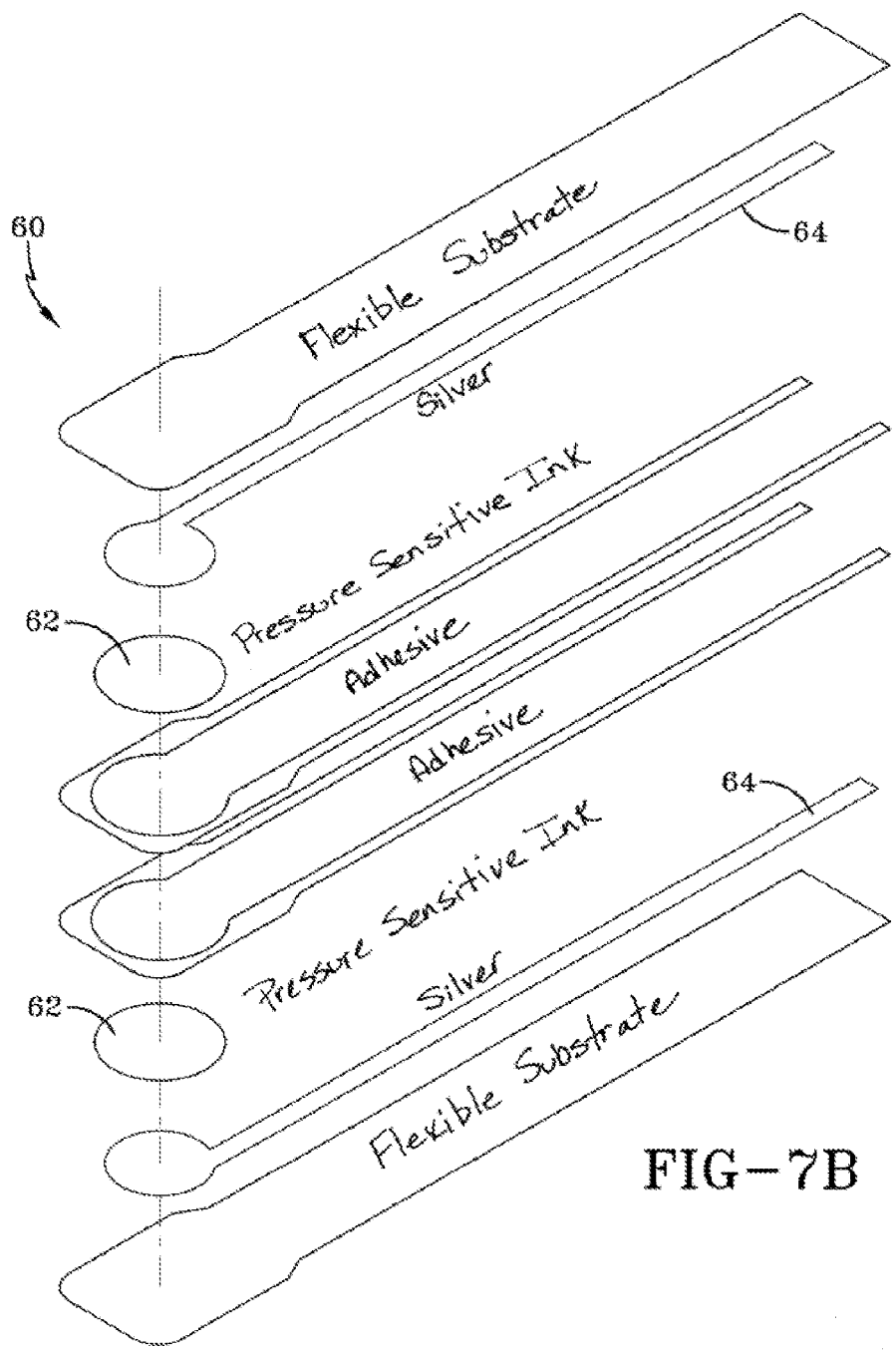
FIG. 7B shows a perspective view of the pressure sensor.

Common curing conditions include temperatures up to 198° C. and pressures that range between 8 pounds per square inch (PSI) in pre-shaping and 400 PSI in the curing phase. With reference now to FIGS. 5-7, 16 pressure sensors 60 are shown mounted on tire 10: 14 out of the 16 pressure sensors 60 on the inner liner 22 surface spaced bead-to-bead 14 and 2 pressure sensor 60 spaced within the tire 10, between the overlay 108 and belt 26. Small gum strips 74 may be used to fix the sensors 60 to the green tire 30 and Mylar film 72 may be used to protect the sensors 60 from curing into the green tire 30. The pressure data measured by the pressure sensors 60 can be communicated out of the tire mold in any manner chosen with the sound judgment of a person of skill in the art. In one embodiment, not shown, the pressure data can be communicated wirelessly. In another embodiment, a signal wire 76 of any type and size chosen with the sound judgment of a person of skill in the art can be used to communicate the pressure data. Two non-limiting examples of signal wire 76 are: Teflon coated copper wire and 28-gauge copper wire with polyimide insulation. The signal wires 76 were electrically connected to sensor pins. The signal wires 76 from all the sensors 60 may then be twisted into a cable. The tread 28 may be peeled back to allow placement of sensors 60 on top of overlay 108. Two sensors 60 may be mounted between the tread 28 and belt 26 if the tire has no overlay: one at the centerline, and the other at the belt edge, as shown in FIGS. 5 and 7A. The approximate timing of the tire loading sequence may be about 100 seconds to 120 seconds. Test results indicated that the pressure sensors 60 can qualitatively detect different cure pressures, as shown in FIG. 8. Test results also show that the pressure sensors 60 can survive cure environment and yield significant data regarding shaping contact and contact pressures.

With reference now to FIG. 2-3, the tire apparatus 50 may include: a tire mold 54, 56; a bladder 58; a tire curing press 52; and, one or more pressure sensors 60. Each pressure sensor 60 may be positioned: (1) between the green tire 30 and the bladder 58; or, (2) between the green tire 30 and the tire mold 54, 56. In either case, the pressure sensor 60 directly measures the pressure unlike the prior art.

With reference now to FIGS. 6 and 7A-7C. The sensor 60 is an ultra-thin, flexible printed circuit. The standard sensor 60 is constructed of two layers of substrate (polyester) film.

Figure 7C:
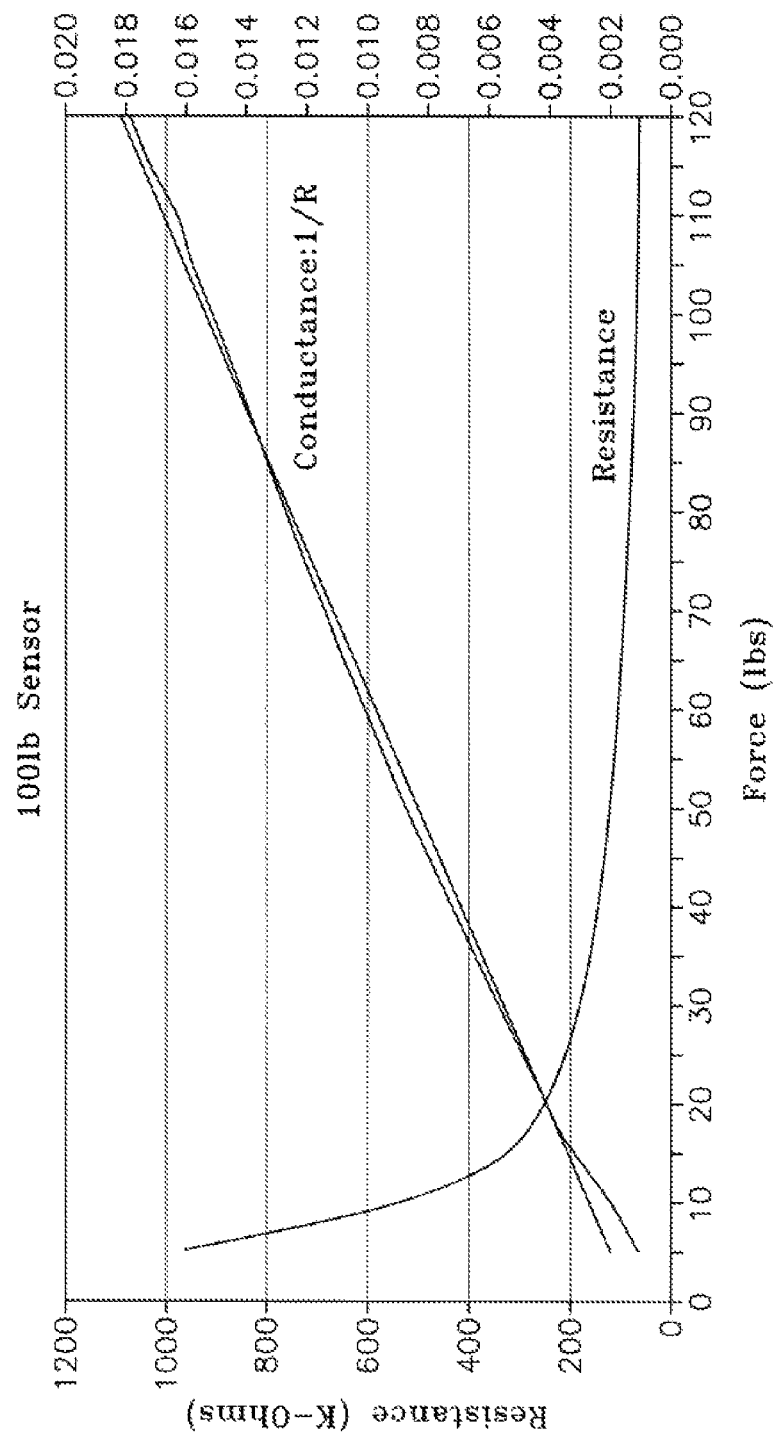
FIG. 7C shows both the resistance vs. force and conductance (1/R) vs. force.

The high-temp model is constructed of two layers of polyimide. On each layer, a conductive material (silver) is applied, followed by a layer of pressure-sensitive ink. Adhesive is then used to laminate the two layers of substrate together to form the sensor 60. The active sensing area is defined by the silver circle 64 on top of the pressure-sensitive ink 62. Silver extends from the sensing area to the connectors at the other end of the sensor 60, forming the conductive leads. A sensor is terminated with male square pins, allowing them to be easily incorporated into a circuit. The two outer pins of the connector are active and the center pin is inactive. The sensor acts as a force sensing resistor in an electrical circuit. When the force sensor is unloaded, its resistance is very high. When a force is applied to the sensor, this resistance decreases. The resistance can be read by connecting a multimeter to the outer two pins, and then applying a force to the sensing area. In FIG. 7C, the plot shows both the resistance vs. force vs. and conductance (1/R) vs. force. Note that the conductance curve is linear, and therefore useful in calibration.

Depending on the needs of the application, users can trim the sensors to the length of their choosing. In the example application, the sensor is trimmed to lengths of 2 inches. In addition, the sensors can be custom-designed to meet the needs of an endless variety of applications and the high-temperature model can measure forces in temperatures up to 200° C. The sensors are pliable enough to allow for non-intrusive measurement. They can be attached to many different surfaces of tires, and can be combined with plastic or metal films for increased stiffness or for added protection from abrasion.

With reference now to FIG. 8, the pressure sensors 60 may be used to communicate the pressure they measure during a time period to a data log device 66 that provides corresponding data that can be used to form a graph showing the force exerted on the green tire 30 versus time. The pressure sensor can be mounted to the green tire.

The pressure sensors of this invention not only permit the accurate measuring of contact sequence, but also have applications in absolute pressure measurement. The pressure sensors may also be used: to compare shaping profiles and pressures; for different bladders shaping the same tire; new versus used bladders; different shaping strategies; measurements of top versus bottom; trapped air versus no trapped air; tires with lights problems; and, for measurements around a tire. Further, one can measure shaping pressure inside tire, such as between components, for example, belt and tread; or under tread lugs versus under grooves.

To use a pressure sensor 60 properly, it may be necessary to: condition the sensor regularly; recalibrate it if it has not been used for an extended period of time; account for the hysteresis; and, flatten the contact surface of the sensor by using a rigid "puck" or disk (not shown in present invention), that distributes the force over the sensing area. The puck must be no larger than the active sensing surface. To calibrate the sensor 60, the sensor 60 may be sandwiched between two rubber mats, which may be covered with Teflon to prevent sticking. Each mat may be ten inches on each side, in one embodiment, to allow for easy conversion between squeezing force and pressure. A programmable press may be used to apply a force to the sensor at stable room temperatures and other operating temperatures such as 100 degrees Celsius or 150 degrees Celsius. To calibrate a group of sensors in one embodiment, all sensors may be preconditioned to at least 350 psi. Then, the sensors may be paired to corresponding handles 67 so that a given sensor will always use the same handle 67. If pucks 128 are used, the pucks 128 may be used with the sensor 60 during calibration. After calibration, the sensors 60 may be used.

First, a decision is made as to the location and number of pressures sensors 60 to be used. In one embodiment, at least one pressure sensor 60 is used to directly measure the pressure between the green tire and the bladder. In another embodiment, at least one pressure sensor 60 is used to directly measure the pressure between the green tire and the tire mold. In one specific embodiment, the pressure sensors 60 can be placed between the inner surface of the green tire juxtaposed to one of the pair of beads. In another specific embodiment, the pressure sensors 60 can be mounted to the inner surface of the green tire juxtaposed to the crown section. In yet other embodiments, pressure sensors 60 can be mounted to the outer surface of the green tire such as to the tread of the green tire at various circumferential locations.

As the pressure sensors 60 are mounted to the green tire 30 the communication wires are extended therefrom. As the green tire 30 is inserted into the tire mold, the communication wires extend outside the tire mold and can be connected to other devices (so the pressure data can be sent there). The measured data during a time period can be communicated by the pressure sensors 60 to a data log device. The data log device provides corresponding data that can be used to form a graph showing the force exerted on the associated green tire versus time. After the tire is cured, the tire mold can be opened to permit removal of the cured tire.

It should be noted that while thus far the pressure sensors have been mounted to an inner surface of the green tire and/or an outer surface of the green tire, it is also contemplated to mount a pressure sensor to an outer surface of the bladder (to directly measure the pressure between the tire and the bladder) and/or to mount a pressure sensor to an inner surface of the tire mold (to directly measure the pressure between the tire and the tire mold). The manner in which pressure sensors are mounted to the bladder and/or the tire mold can be any chosen with the sound judgment of a person of skill in the art.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:
1. A method comprising the steps of:
    (A) providing a bladder, a tire mold and, a green tire having a pair of annular beads and one or more plies;
    (B) mounting a first pressure sensor to an inner surface of the green tire between an overlay and a belt; wherein the first pressure sensor is a flexible printed circuit;
    (C) inserting the green tire into the tire mold and closing the tire mold;
    (D) shaping the green tire by expanding the bladder within the green tire against the closed tire mold; and,
    (E) directly measuring the pressure between the overlay and the belt of the green tire during step (D) with the first pressure sensor.
2. The method of claim 1 wherein step (E) comprises communicating a plurality of pressures measured by the first pressure sensor during a time period to a device that provides corresponding data that can be used to form a graph showing the force exerted on the first pressure sensor.

3. The method of claim 1 which further comprises (F) vulcanizing the green tire within the tire mold to produce a cured tire.

4. The method of claim 3 which further comprises directly measuring the pressure between the overlay and the belt of the green tire with the first pressure sensor as the tire is vulcanized in step (F).

5. The method of claim 4 which further comprises the steps of (G) opening the tire mold; and (H) removing the cured tire from the tire mold.

6. The method of claim 1 wherein step (B) further comprises mounting a second pressure sensor to an outer surface of the green tire or an inner surface of the tire mold; and wherein step (E) further comprises directly measuring the pressure between the green tire and the tire mold during steps (D) and (F) with the second pressure sensor.

7. The method of claim 6 wherein step (A) further comprises providing the green tire with a pair of beads, a crown section and a tread; wherein step (B) further comprises mounting the second pressure sensor to the one of the outer surface of the green tire and the inner surface of the tire mold at first circumferential tread location.

8. The apparatus of claim 6 wherein the second pressure sensor communicates sensed absolute pressure wirelessly.

9. The method of claim 6 wherein the second pressure sensor communicates sensed absolute pressure via a signal wire.

10. The method of claim 7 which further comprises mounting a third pressure sensor to one of the inner surface of the green tire and an outer surface of the bladder juxtaposed to the crown section.

11. The method of claim 10 which further comprises mounting a fourth pressure sensor to an outer surface of the green tire or an inner surface of the tire mold at a second circumferential tread location.

12. The method of claim 11 which further directly measures the pressure between the green tire and the bladder during steps (D) and (F) with the third pressure sensor and directly measures the pressure between the green tire and the tire mold during steps (D) and (F) with the fourth pressure sensor.

13. The method of claim 12 which further comprises communicating a plurality of pressures measured by each of the first, second, third and fourth pressure sensors during a time period to a device that provides corresponding data that can be used to form a graph showing the forces exerted on the associated green tire versus time.

14. The method of claim 1 wherein each of the first pressure sensors operate at pressures at least up to 400 pounds per square inch and at temperatures at least up to 200° C.

15. The method of claim 1 wherein the first pressure sensor communicates sensed absolute pressure wirelessly.

16. The method of claim 1 wherein the first pressure sensor communicates sensed absolute pressure via a signal wire.

17. A method comprising the steps of:
(A) providing a bladder, a tire mold and, a green tire having a pair of annular beads and one or more plies;
(B) mounting a first pressure sensor to an inner surface of the green tire between an overlay and a belt; wherein the first pressure sensor includes an active sensing area which is defined by a silver circle on top of a pressure-sensitive ink;
(C) inserting the green tire into the tire mold and closing the tire mold;
(D) shaping the green tire by expanding the bladder within the green tire against the closed tire mold; and,
(E) directly measuring the pressure between the overlay and the belt of the green tire during step (D) with the first pressure sensor.

18. The method of claim 17 which further comprises directly measuring the pressure between the overlay and the belt of the green tire with the first pressure sensor as the tire is vulcanized in step (F).

19. A method comprising the steps of:
(A) providing a bladder, a tire mold and, a green tire having a pair of annular beads and one or more plies;
(B) mounting a first pressure sensor to an inner surface of the green tire between an overlay and a belt; wherein the first pressure sensor is comprised of two layers of a substrate which is coated with a conductive material and a pressure-sensitive ink;
(C) inserting the green tire into the tire mold and closing the tire mold;
(D) shaping the green tire by expanding the bladder within the green tire against the closed tire mold; and,
(E) directly measuring the pressure between the overlay and the belt of the green tire during step (D) with the first pressure sensor.

20. The method of claim 19 wherein the conductive material is comprised of silver.

* * * * *